United States Patent
Pitchko et al.

(10) Patent No.: US 7,178,806 B1
(45) Date of Patent: Feb. 20, 2007

(54) CINCHPAC SELF-LOADING ROTARY SHAFT SEAL

(76) Inventors: David Pitchko, 1165 Marlkress Rd., Unit J, Cherry Hill, NJ (US) 08003; Joseph Bartle, 1133 Layton Rd., Philadelphia, PA (US) 19115

( * ) Notice: Subject to any disclaimer, the term of this patent is extended or adjusted under 35 U.S.C. 154(b) by 0 days.

(21) Appl. No.: 10/136,395

(22) Filed: May 2, 2002

Related U.S. Application Data

(60) Provisional application No. 60/289,823, filed on May 10, 2001.

(51) Int. Cl.
*F16J 15/34* (2006.01)

(52) U.S. Cl. .................... 277/371; 277/511; 277/520

(58) Field of Classification Search ............... 277/500, 277/423, 370, 371, 411, 579, 581, 417, 372, 277/373, 511, 520, 531
See application file for complete search history.

(56) References Cited

U.S. PATENT DOCUMENTS

| | | | | |
|---|---|---|---|---|
| 2,189,686 A | * | 2/1940 | Stevenson | 384/150 |
| 2,367,403 A | * | 1/1945 | Kosatka | 277/366 |
| 2,561,694 A | | 7/1951 | Gilbert, Sr. | |
| 2,586,739 A | * | 2/1952 | Summers | 277/362 |
| 2,888,281 A | | 5/1959 | Ratti | |
| 3,013,830 A | * | 12/1961 | Milligan | 277/439 |
| 3,351,350 A | * | 11/1967 | Shepler | 277/530 |
| 3,770,284 A | | 11/1973 | Galloway | |
| 3,940,154 A | * | 2/1976 | Olsson | 277/381 |
| 3,988,026 A | | 10/1976 | Kemp, Jr. | |
| 4,099,728 A | * | 7/1978 | Wiese | 277/399 |
| 4,358,119 A | * | 11/1982 | Kryczun | 277/369 |
| 4,809,992 A | * | 3/1989 | Kemp et al. | 277/369 |
| 4,817,966 A | * | 4/1989 | Borowski | 277/424 |
| 5,024,450 A | * | 6/1991 | Hawley et al. | 277/366 |
| 5,039,111 A | * | 8/1991 | Kemp, Jr. | 277/500 |
| 5,125,672 A | * | 6/1992 | Wycliffe | 277/351 |
| 5,409,240 A | * | 4/1995 | Ballard | 277/366 |
| 5,951,020 A | * | 9/1999 | Orlowski | 277/419 |
| 6,098,753 A | * | 8/2000 | Lamarre et al. | 184/6.11 |
| 6,186,510 B1 | * | 2/2001 | Reagan | 277/371 |
| 6,224,063 B1 | * | 5/2001 | Faass | 277/371 |
| 6,247,702 B1 | * | 6/2001 | Long et al. | 277/417 |

* cited by examiner

*Primary Examiner*—William L. Miller
(74) *Attorney, Agent, or Firm*—Patent Trademark Services; Joseph H. McGlynn

(57) ABSTRACT

A seal for a conveyor drive which has an elastomer which is compressed between a cap ring and a housing.

7 Claims, 2 Drawing Sheets

CINCHPAC SELF-LOADING ROTARY SHAFT SEAL

Applicants claim priority of Provisional application Ser. No. 60/289,823, filed May 10, 2001.

BACKGROUND OF THE INVENTION

This invention relates, in general, to seals, and, in particular, to seals for rotating shafts.

DESCRIPTION OF THE PRIOR ART

In the prior art various types of seals have been proposed. For example, U.S. Pat. No. 3,988,026 to Kemp, Jr. discloses a seal for a conveyor drive which has an elastomer which is compressed between a cap ring and a housing U.S. Pat. No. 2,888,281 to Ratti discloses a shaft seal which has two pair of wings which engage opposite ends of a housing for sealing purposes.

U.S. Pat. No. 3,770,284 to Galloway discloses a shaft seal comprising a ring of microcellular polyurethane which fits on a shaft and has one holding end and one sealing end.

U.S. Pat. No. 2,561,694 to Gilbert, Sr. discloses a rotary seal compressed about a shaft by a circular compression band.

SUMMARY OF THE INVENTION

The present invention is directed to a seal for a conveyor drive which has an elastomer which is compressed between a cap ring and a housing.

It is an object of the present invention to provide a new and improved seal for a rotary shaft.

It is an object of the present invention to provide a new and improved seal for a rotary shaft which have ridges that act as dams to prevent contaminants from migrating down the shaft.

It is an object of the present invention to provide a new and improved seal for a rotary shaft which is dynamic with the rotary shaft.

These and other objects and advantages of the present invention will be fully apparent from the following description, when taken in connection with the annexed drawings.

DESCRIPTION OF THE PREFERRED EMBODIMENT

Figure 1:
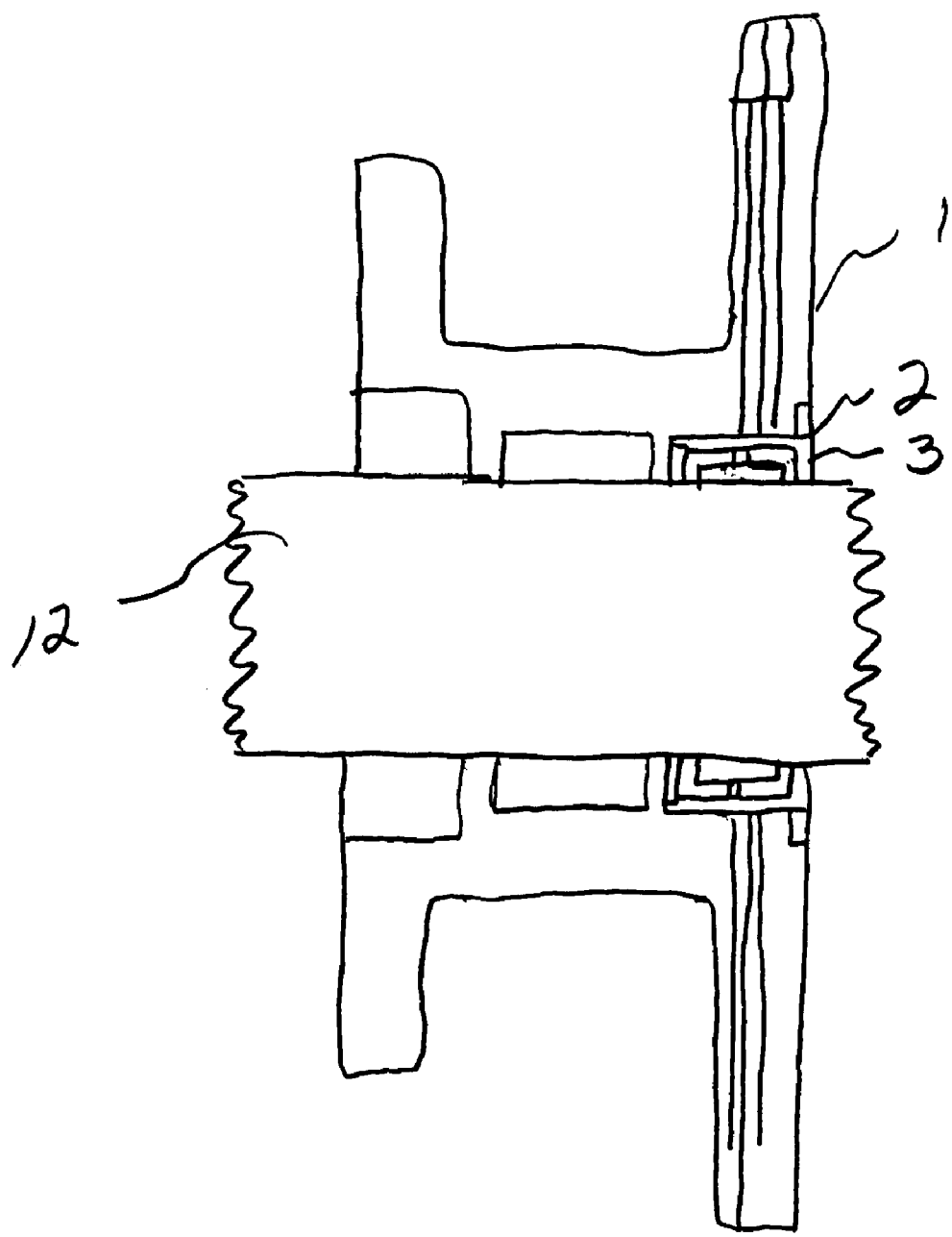
FIG. 1 is cross-sectional view showing the present invention mounted on a shaft.

Referring now to the drawings in greater detail, FIG. 1 shows the seal of the present invention mounted in a housing 1 for gear drives on bulk handling equipment. The specific type of housing, gear drive or bulk handling equipment is not critical to the seal of the invention and, therefore, no specific details are shown. A rotating shaft 12 (partly shown in FIG. 1 will extend through the housing 1 and be connect to the bulk handling equipment (not shown). The seal of the present invention is a cartridge that is pressed into an aperture 2 in the housing 1 and the seal will be static to the shaft 12, that is the seal will rotate with the shaft 12.

The conventional seal, called a lipseal, is dynamic to the shaft, that is, it is stationary with the housing and the shaft rotates with respect to the seal. This causes deterioration due to the friction between the shaft and the lipseal and the lipseal is subject to attack by the powder or other bulk material being handled. The conventional lipseals were found to wear out in 2000 hours whereas the seal of the present invention have been running over six months with no deterioration.

Figure 2:
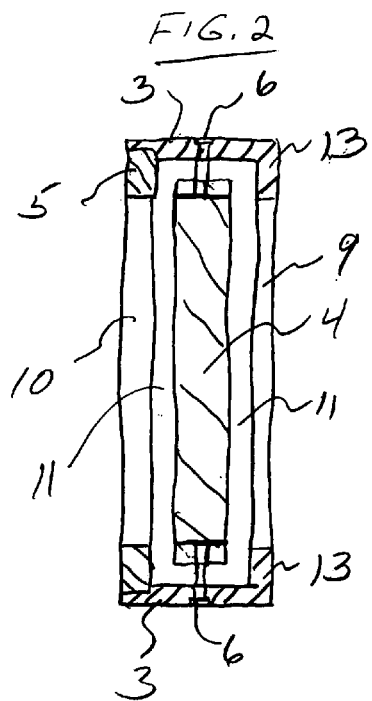
FIG. 2 is a cross-sectional view of the present invention.
Figure 3:
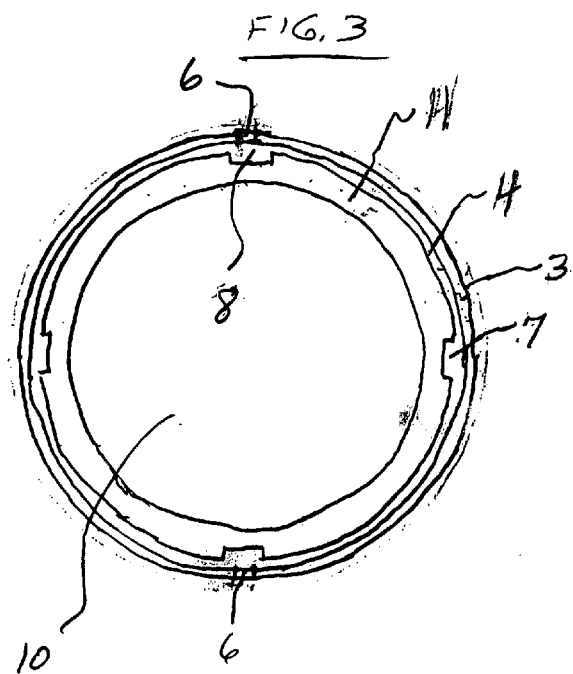
FIG. 3 is a plan view of the present invention.

The seal cartridge that incorporates the present invention is shown in FIGS. 2 and 3. The cartridge comprises a housing 3 which can be made from any conventional material that will serve the intended purpose. An aperture 9, 10 extends through the housing and will receive the shaft 12. A lip 13 extends down from the top of the housing 3 at one end of the housing to serve as a stop for the boot 4. A rotor cup 11 is sandwiched between the lip 13 and the boot 4 to prevent the boot from slipping through the housing 3. A second rotor cup 11 is placed on the opposite side of the boot 4. As shown in FIG. 2 the rotor cups surround the boot at the front, back, top and bottom.

A cap ring 5 is placed at one side of the housing (the left side as shown in FIG. 2) which will secure the rotor cups and the boot within the housing 3. Obviously, the cap ring, rotor cups and the boot will all have a central aperture (not seen in FIG. 2) which will allow the shaft 12 to pass through. In order to assemble the seal cartridge onto the shaft 12, the cartridge can be assemble before hand and then forced onto the outside of the shaft, or the housing 3 can be passed onto the shaft 12, then the first rotor cup 11 (shown on the right in FIG. 2) is put on the shaft, then the boot 4, the second rotor cup 11, and finally the cap ring 5. When the cap ring is assembled into the housing with a force fit, it will tend to try to compress the boot 4 parallel to the shaft 12. Since the boot can not be compressed in this direction due to the housing 3 and the rotor cups 11, the boot will deform in the direction of the shaft 12. This will firmly secure the boot 4 to the shaft 12 so the boot, and in fact the entire cartridge will rotate with the shaft.

Figure 4:
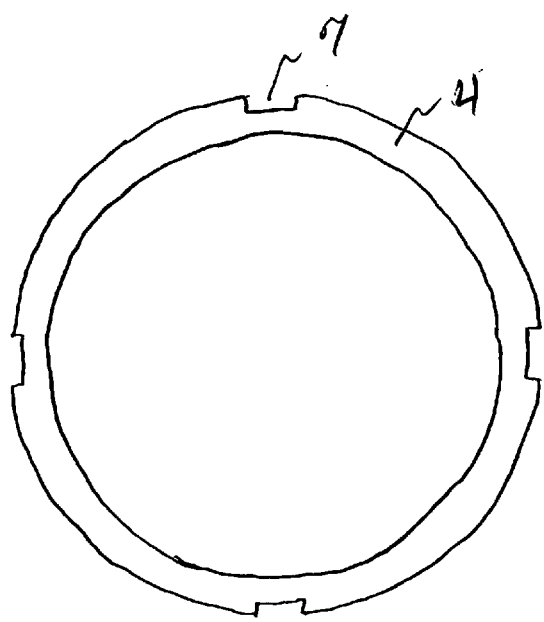
FIG. 4 is a plan view of the boot of the present invention.
Figure 5:
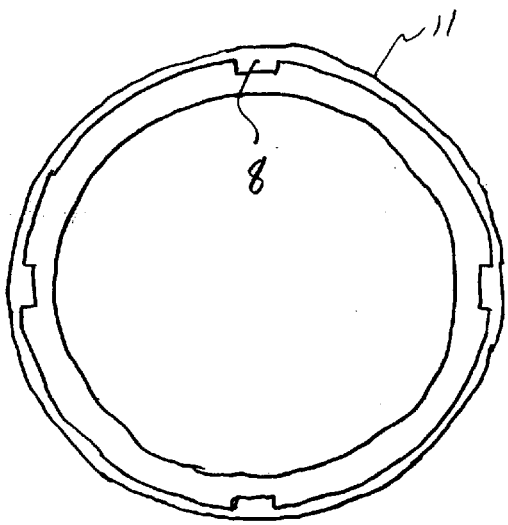
FIG. 5 is a plan view of the cup of the present invention.
Figure 1:
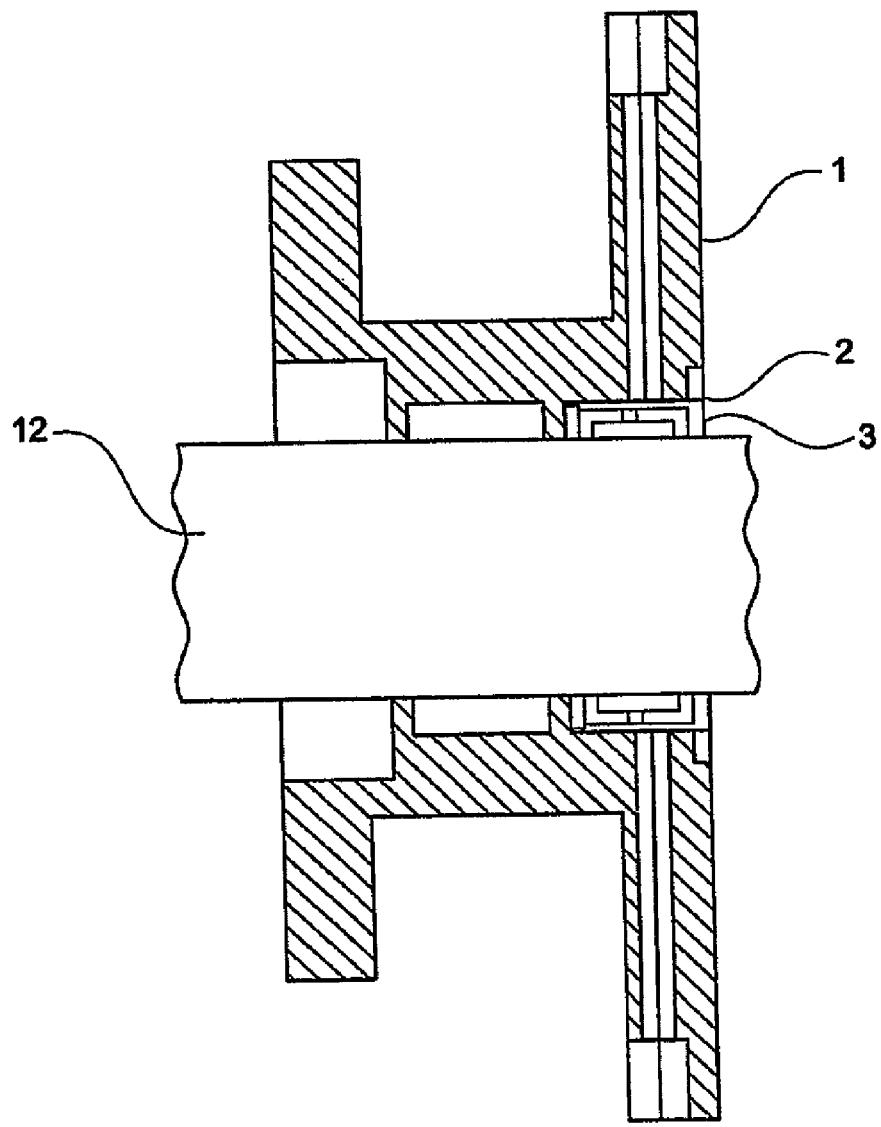
Figure 2:
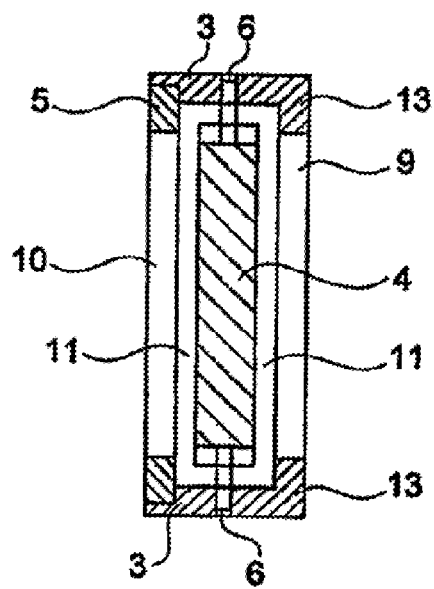
Figure 3:
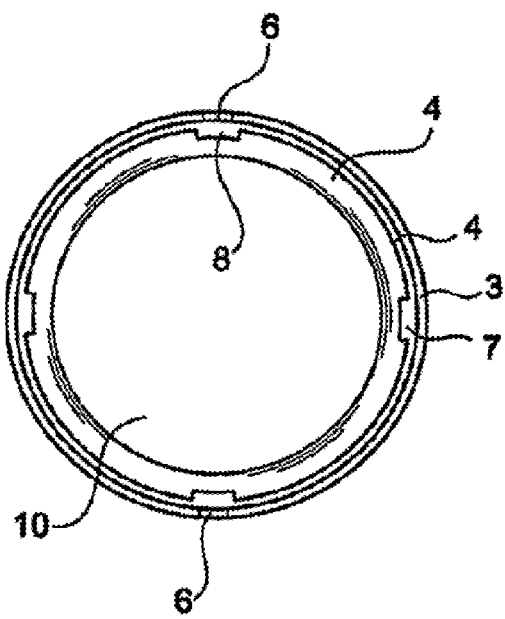
Figure 4:
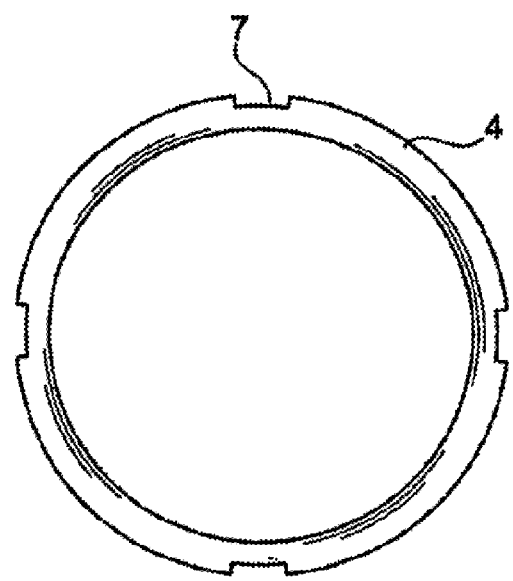
Figure 5:
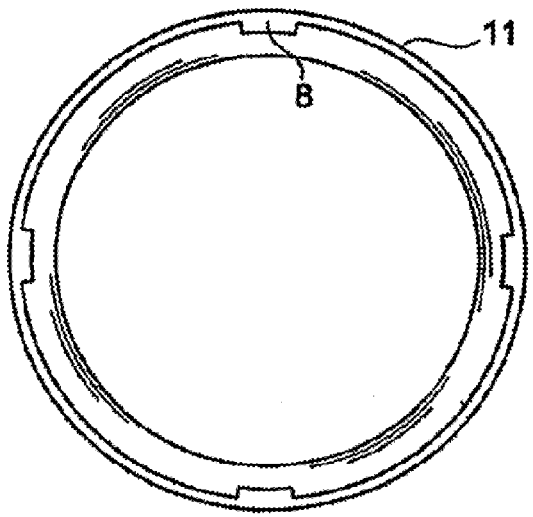

As shown in FIGS. 4 and 5, the boot 4 has a series of apertures 7 and the rotor cups 11 have a series of projections 8. The projections 8 will engage the apertures 7 when the rotor cups and the boot are assembled. This will lock the rotor cups and the boot together, thereby insuring that the assembled cartridge will rotate with the shaft 12.

The housing 3 has an aperture 6 that allows air or grease to be pumped into the inner cavity of the seal to remove contaminants, which will help to extend the life of the seal.

Although the Cinch Pack Self-Loading Rotary Shaft Seal and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

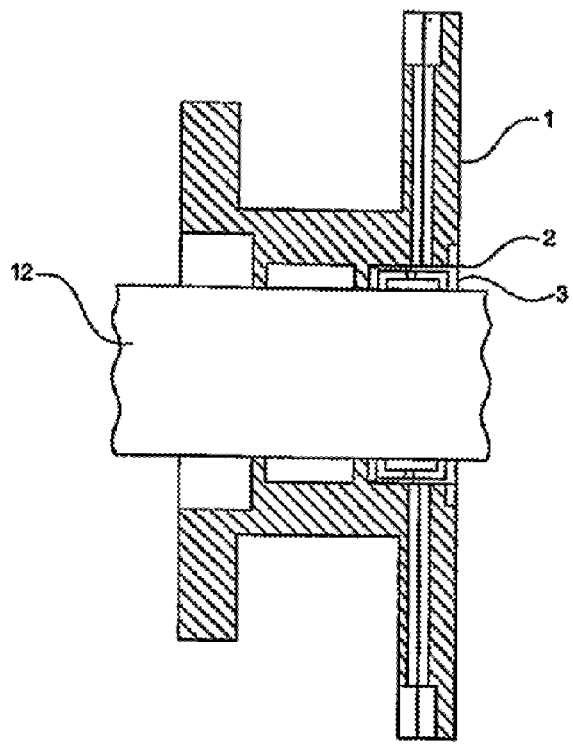

What we claim as my invention is:

1. A seal adapted to be placed on and secured to a rotating shaft in combination with said rotating shaft, said seal comprising:
   a housing,
   said housing having a top and a bottom, a front and a back, and an inner surface and an outer surface, said housing having an aperture extending from said front to said back, at least one rotor cup secured within said housing, at least one seal boot secured within said housing adjacent said rotor cup, means on said housing for holding said seal boot and said rotor cup within said housing, and said rotor cup and said seal boot having means for interlocking said rotor cup and said seal boot, and means for compressing said seal boot, and wherein said means for compressing said seal boot is inserted within said housing for pressing against said rotor cup and which forces said rotor cup against said seal boot for securing said seal boot, said housing and said at least one rotor cup to said rotating shaft so they rotate with said rotating shaft.

2. The seal as claimed in claim 1, wherein there are two rotor cups, one on opposite sides of said seal boot.

3. The seal as claimed in claim 1, wherein said means on said housing for holding said seal boot and said rotor cup within said housing is a depending lip attached to one of said front or said back of said housing.

4. The seal as claimed in claim 1, wherein said means inserted within said housing for pressing against said rotor cup is a ring, and said ring is frictionally engaged with said inner surface of said housing.

5. The seal as claimed in claim 1, wherein said means for interlocking said rotor cup and said seal boot are at least one projection on said rotor cup and at least one groove on said seal boot.

6. The seal as claimed in claim 1, wherein said housing and said seal boot have means for allowing a liquid to be introduced through said housing into said seal boot.

7. The seal as claimed in claim 6, wherein said means for allowing a liquid to be introduced through said housing into said seal boot is aligned apertures in said housing and said seal boot.

* * * * *

UNITED STATES PATENT AND TRADEMARK OFFICE
CERTIFICATE OF CORRECTION

| | | |
|---|---|---|
| PATENT NO. | : 7,178,806 B1 | |
| APPLICATION NO. | : 10/136395 | |
| DATED | : February 20, 2007 | |
| INVENTOR(S) | : Joseph Bartle | |

It is certified that error appears in the above-identified patent and that said Letters Patent is hereby corrected as shown below:

The title page showing the illustrative figure should be deleted and substitute with the attached title page.

The drawing sheet, consisting of Fig. 1 and 2, should be deleted and replaced with drawing sheet, consisting of Fig. 1 and 2, as shown on the attached page.

Signed and Sealed this

Twenty-first Day of August, 2007

JON W. DUDAS
*Director of the United States Patent and Trademark Office*

(12) United States Patent
Pitchko et al.

(10) Patent No.: US 7,178,806 B1
(45) Date of Patent: Feb. 20, 2007

(54) CINCHPAC SELF-LOADING ROTARY SHAFT SEAL

(76) Inventors: David Pitchko, 1165 Markress Rd., Unit J, Cherry Hill, NJ (US) 08003; Joseph Bartle, 1133 Layton Rd., Philadelphia, PA (US) 19115

(*) Notice: Subject to any disclaimer, the term of this patent is extended or adjusted under 35 U.S.C. 154(b) by 0 days.

(21) Appl. No.: 10/136,395

(22) Filed: May 2, 2002

Related U.S. Application Data

(60) Provisional application No. 60/289,823, filed on May 10, 2001.

(51) Int. Cl.
*F16J 15/34* (2006.01)

(52) U.S. Cl. .................. 277/371; 277/511; 277/520

(58) Field of Classification Search .......... 277/500, 277/423, 370, 371, 411, 579, 581, 417, 372, 277/373, 511, 520, 531
See application file for complete search history.

(56) References Cited

U.S. PATENT DOCUMENTS

| | | | | |
|---|---|---|---|---|
| 2,189,686 A | * | 2/1940 | Stevenson | 384/150 |
| 2,367,403 A | * | 1/1945 | Kosatka | 277/366 |
| 2,551,694 A | | 7/1951 | Gilbert, Sr. | |
| 2,586,739 A | * | 2/1952 | Summers | 277/562 |
| 2,888,281 A | | 5/1959 | Ratti | |
| 3,013,830 A | * | 12/1961 | Milligan | 277/439 |
| 3,351,350 A | * | 11/1967 | Shepler | 277/530 |
| 3,770,284 A | | 11/1973 | Galloway | |
| 3,940,154 A | * | 2/1976 | Olsson | 277/381 |
| 3,988,026 A | | 10/1976 | Kemp, Jr. | |
| 4,099,728 A | * | 7/1978 | Wiese | 277/399 |
| 4,358,119 A | * | 11/1982 | Kryczun | 277/369 |
| 4,809,992 A | * | 3/1989 | Kemp et al. | 277/369 |
| 4,817,966 A | * | 4/1989 | Borowski | 277/424 |
| 5,024,450 A | * | 6/1991 | Hawley et al. | 277/366 |
| 5,039,111 A | * | 8/1991 | Kemp, Jr. | 277/500 |
| 5,125,672 A | * | 6/1992 | Wycliffe | 277/351 |
| 5,409,240 A | * | 4/1995 | Ballard | 277/365 |
| 5,951,020 A | * | 9/1999 | Orlowski | 277/419 |
| 6,098,753 A | | 8/2000 | Lamarre et al. | 184/6.11 |
| 6,186,510 B1 | | 2/2001 | Reagan | 277/371 |
| 6,224,063 B1 | * | 5/2001 | Faas | 277/371 |
| 6,247,702 B1 | * | 6/2001 | Long et al. | 277/417 |

* cited by examiner

*Primary Examiner*—William L. Miller
(74) *Attorney, Agent, or Firm*—Patent Trademark Services; Joseph H. McGlynn

(57) ABSTRACT

A seal for a conveyor drive which has an elastomer which is compressed between a cap ring and a housing.

7 Claims, 2 Drawing Sheets